United States Patent
Fang

(10) Patent No.: US 11,656,320 B2
(45) Date of Patent: May 23, 2023

(54) METHOD AND APPARATUS FOR RADAR WAVEFORMS USING ORTHOGONAL SEQUENCE SETS

(71) Applicant: Metawave Corporation, Palo Alto, CA (US)

(72) Inventor: Jun Fang, Palo Alto, CA (US)

(73) Assignee: METAWAVE Corporation, Carlsbad, CA (US)

( * ) Notice: Subject to any disclaimer, the term of this patent is extended or adjusted under 35 U.S.C. 154(b) by 234 days.

(21) Appl. No.: 16/248,721

(22) Filed: Jan. 15, 2019

(65) Prior Publication Data

US 2019/0219683 A1 Jul. 18, 2019

Related U.S. Application Data

(60) Provisional application No. 62/617,528, filed on Jan. 15, 2018.

(51) Int. Cl.
| | |
|---|---|
| *G01S 7/02* | (2006.01) |
| *G01S 13/58* | (2006.01) |
| *G01S 13/93* | (2020.01) |
| *G01S 7/35* | (2006.01) |
| *G01S 13/931* | (2020.01) |

(52) U.S. Cl.
CPC ............. *G01S 7/023* (2013.01); *G01S 7/0233* (2021.05); *G01S 7/0234* (2021.05); *G01S 7/35* (2013.01); *G01S 13/584* (2013.01); *G01S 13/93* (2013.01); *G01S 13/931* (2013.01)

(58) Field of Classification Search
CPC ...... G01S 13/584; G01S 13/93; G01S 13/931; G01S 13/343; G01S 13/345; G01S 7/35

USPC .................................................... 342/109, 70
See application file for complete search history.

(56) References Cited

U.S. PATENT DOCUMENTS

| | | | | |
|---|---|---|---|---|
| 5,151,702 A | * | 9/1992 | Urkowitz | G01S 13/522 342/134 |
| 5,429,137 A | * | 7/1995 | Phelps | G01P 5/244 600/455 |
| 5,808,580 A | * | 9/1998 | Andrews, Jr. | G01S 13/582 367/90 |

(Continued)

FOREIGN PATENT DOCUMENTS

RU 117794 U1 * 7/2012 ............. G01S 13/28

OTHER PUBLICATIONS

Simulation results of ranging performance in two-ray multipath model by Eui Seok Kim provided by Research Gate (Year: 2008).*

(Continued)

*Primary Examiner* — Erin F Heard
*Assistant Examiner* — Michael W Justice
(74) *Attorney, Agent, or Firm* — Sandra Lynn Godsey

(57) ABSTRACT

Systems, methods, and apparatus for radar waveforms using orthogonal sequence sets are disclosed. In one or more examples, a vehicle for autonomous driving comprises a radar sensor. In some examples, the radar sensor comprises a waveform transmission module adapted to generate a phase-coded waveform based on a set of concatenated orthogonal sequences. Also, in some examples, the radar sensor comprises a receiver adapted to estimate a range and Doppler from a received echo from the phase-coded waveform. In one or more examples, the orthogonal sequences are Zadoff-Chu (ZC) sequences.

19 Claims, 6 Drawing Sheets

(56) References Cited

U.S. PATENT DOCUMENTS

| | | | | |
|---|---|---|---|---|
| 5,828,333 | A * | 10/1998 | Richardson | G01S 13/325 375/130 |
| 6,614,387 | B1 * | 9/2003 | Deadman | G01S 13/825 340/435 |
| 7,265,712 | B2 * | 9/2007 | Merkel | G01S 13/284 359/240 |
| 7,839,321 | B2 * | 11/2010 | Huang | G01S 13/933 342/134 |
| 7,920,598 | B2 * | 4/2011 | Luo | H04J 11/0069 370/350 |
| 8,773,968 | B2 * | 7/2014 | Jiang | H04J 13/0074 370/252 |
| 8,902,103 | B2 * | 12/2014 | Kim | G01S 13/345 342/134 |
| 8,981,988 | B2 * | 3/2015 | Kojima | G01S 13/753 342/51 |
| 9,516,513 | B2 * | 12/2016 | Sægrov | G01S 5/12 |
| 9,689,967 | B1 * | 6/2017 | Stark | H04B 17/309 |
| 9,749,680 | B2 * | 8/2017 | Kwon | H04L 65/608 |
| 9,772,397 | B1 * | 9/2017 | Bordes | G01S 13/931 |
| 9,774,424 | B2 * | 9/2017 | Jiang | H04L 27/2613 |
| 9,791,551 | B1 * | 10/2017 | Eshraghi | G01S 7/038 |
| 9,846,228 | B2 * | 12/2017 | Davis | H04J 11/0069 370/509 |
| 9,869,750 | B2 * | 1/2018 | Cheng | G01S 5/0036 |
| 9,945,943 | B2 * | 4/2018 | Stark | G01S 13/345 342/134 |
| 9,954,955 | B2 * | 4/2018 | Davis | G01S 15/8915 |
| 10,092,192 | B2 * | 10/2018 | Lashkari | G01S 15/8915 |
| 10,145,954 | B2 * | 12/2018 | Davis | H04L 27/2607 370/208 |
| 10,215,853 | B2 * | 2/2019 | Stark | H04L 27/2613 |
| 10,261,179 | B2 * | 4/2019 | Davis | G01S 13/582 367/90 |
| 10,469,125 | B2 * | 11/2019 | Robertson | H04W 12/12 |
| 10,536,529 | B2 * | 1/2020 | Davis | G01S 13/933 342/134 |
| 10,591,590 | B1 * | 3/2020 | Anvari | H04L 5/0048 |
| 10,627,483 | B2 * | 4/2020 | Rao | H04J 13/0062 |
| 10,666,314 | B2 * | 5/2020 | Hadani | H04L 5/0048 |
| 10,861,327 | B2 * | 12/2020 | Vanderveen | G06V 20/58 |
| 10,908,272 | B2 * | 2/2021 | Rao | H04J 13/0029 |
| 11,044,032 | B2 * | 6/2021 | Axnäs | H04J 13/0029 |
| 11,212,026 | B2 * | 12/2021 | Iwai | H04L 27/2634 |
| 2006/0049981 | A1 * | 3/2006 | Merkel | G01S 13/0209 342/195 |
| 2008/0291945 | A1 * | 11/2008 | Luo | H04J 11/0069 370/509 |
| 2009/0046629 | A1 * | 2/2009 | Jiang | H04J 13/0059 370/328 |
| 2010/0214152 | A1 * | 8/2010 | Huang | G01S 13/288 342/120 |
| 2010/0271258 | A1 * | 10/2010 | Takabayashi | G01S 13/931 342/107 |
| 2012/0235857 | A1 * | 9/2012 | Kim | G01S 13/931 342/134 |
| 2013/0181858 | A1 * | 7/2013 | Kojima | G01S 13/787 342/51 |
| 2014/0085128 | A1 * | 3/2014 | Kishigami | G01S 13/42 342/147 |
| 2014/0105054 | A1 * | 4/2014 | Sægrov | G01S 5/12 370/252 |
| 2014/0341010 | A1 * | 11/2014 | Jiang | H04L 27/2607 370/208 |
| 2015/0360611 | A1 * | 12/2015 | Cherkaoui | B60W 30/095 340/436 |
| 2016/0213258 | A1 * | 7/2016 | Lashkari | G01S 15/8915 |
| 2016/0223641 | A1 * | 8/2016 | Cheng | G01S 5/0036 |
| 2017/0026075 | A1 * | 1/2017 | Robertson | H04J 13/0062 |
| 2017/0102457 | A1 * | 4/2017 | Li | G01S 7/35 |
| 2017/0293025 | A1 * | 10/2017 | Davis | G01S 13/931 |
| 2017/0293027 | A1 * | 10/2017 | Stark | G01S 7/0234 |
| 2017/0307729 | A1 * | 10/2017 | Eshraghi | G01S 7/0232 |
| 2017/0310758 | A1 * | 10/2017 | Davis | G01S 13/931 |
| 2018/0011170 | A1 * | 1/2018 | Rao | H04J 11/0069 370/350 |
| 2018/0031674 | A1 * | 2/2018 | Bordes | G01S 15/8915 |
| 2018/0095163 | A1 * | 4/2018 | Lovberg | G01S 13/787 342/51 |
| 2018/0100918 | A1 * | 4/2018 | Davis | G01S 13/931 342/134 |
| 2018/0115998 | A1 * | 4/2018 | Schreiber | H04L 27/2613 |
| 2018/0231652 | A1 * | 8/2018 | Rao | G08G 1/096791 |
| 2018/0231655 | A1 * | 8/2018 | Stark | G01S 5/0036 |
| 2018/0241822 | A1 * | 8/2018 | Davis | G06V 20/58 |
| 2018/0252809 | A1 * | 9/2018 | Davis | G01S 13/325 375/130 |
| 2018/0329027 | A1 * | 11/2018 | Eshraghi | H04J 13/0074 370/252 |
| 2019/0094353 | A1 * | 3/2019 | Davis | G01S 13/42 342/147 |
| 2019/0221110 | A1 * | 7/2019 | Vanderveen | G08G 1/096791 |
| 2019/0271776 | A1 * | 9/2019 | Davis | G01S 13/0209 342/195 |
| 2019/0379422 | A1 * | 12/2019 | Hadani | H04L 5/0048 |
| 2020/0007260 | A1 * | 1/2020 | Axnäs | H04J 13/0029 |
| 2020/0127756 | A1 * | 4/2020 | Iwai | H04J 13/14 |
| 2020/0153907 | A1 * | 5/2020 | Davis | H04W 12/12 |
| 2020/0209352 | A1 * | 7/2020 | Rao | G01S 5/12 |
| 2021/0156979 | A1 * | 5/2021 | Rao | G01S 13/931 342/107 |

OTHER PUBLICATIONS

Mo-Han Fong, Concatenated Orthogonal/PN codes for DS-CDMA systems in a Multi-user and Multipath Fading Environment, IEEE. (Year: 1994).* https://en.wikipedia.org/wiki/Zadoff%E2%80%93Chu_sequence (Year: 2015).*

Hyder, M. MD., et al.: "Zadoff-Chu Sequence Design for Random Access Initial Uplink Synchronization," arXiv:1604.01476v1 [cs.IT], Apr. 6, 2016.

Popovic, B.M.: "Generalized Chirp-Like Polyphase Sequences with Optimum Correlation Properties," IEEE Trans. Inform. Theory, vol. 38, No. 4, pp. 1406-1409, Jul. 1992.

Chu, D.C.: "Polyphase Codes with Good Periodic Correlation Properties," IEEE Trans. Inform. Theory, vol. 18, No. 4, pp. 531-532, Jul. 1972.

* cited by examiner

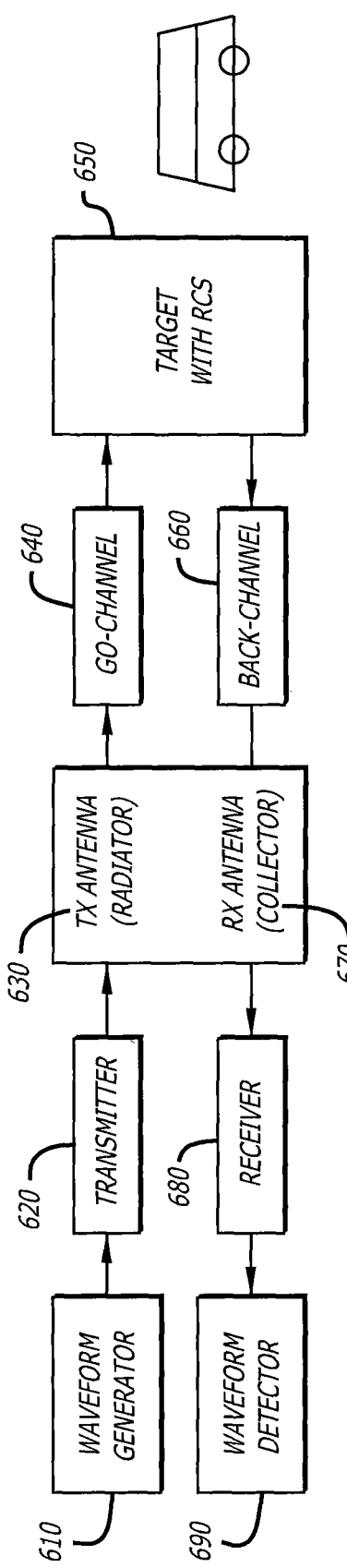
FIG. 6  AUTOMOTIVE RADAR SYSTEM BLOCK DIAGRAM BASED ON PROPOSED PHASE-CODED WAVEFORM
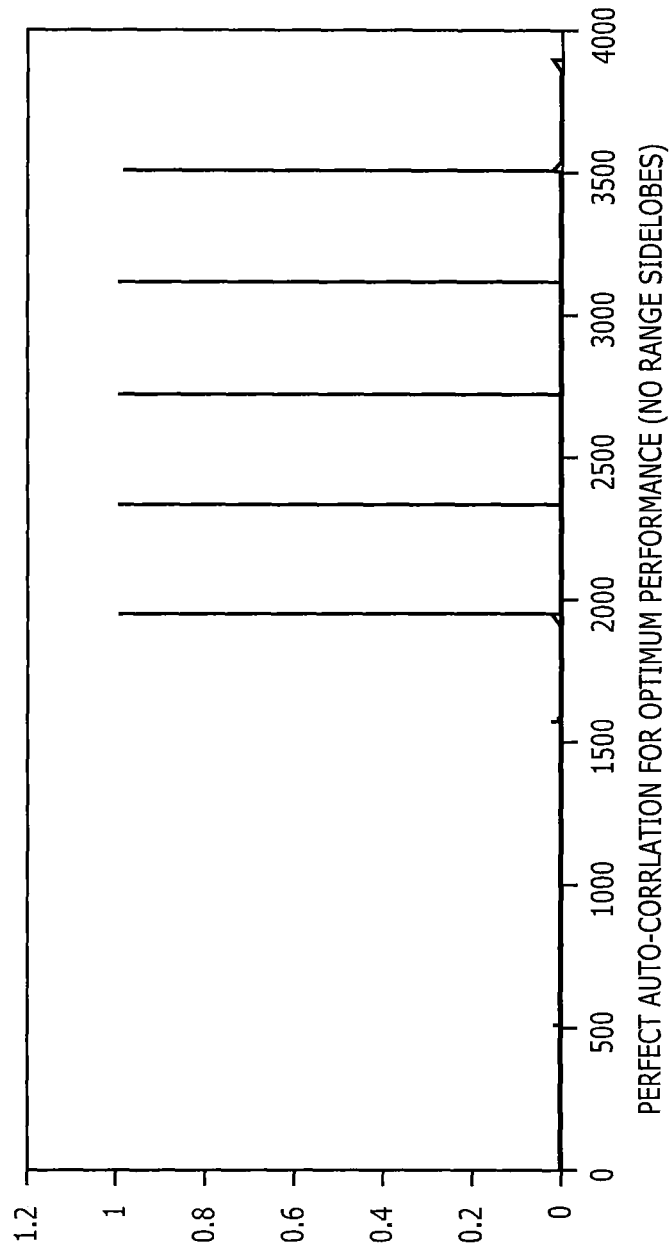
FIG. 7A  PERFECT AUTO-CORRLATION FOR OPTIMUM PERFORMANCE (NO RANGE SIDELOBES)

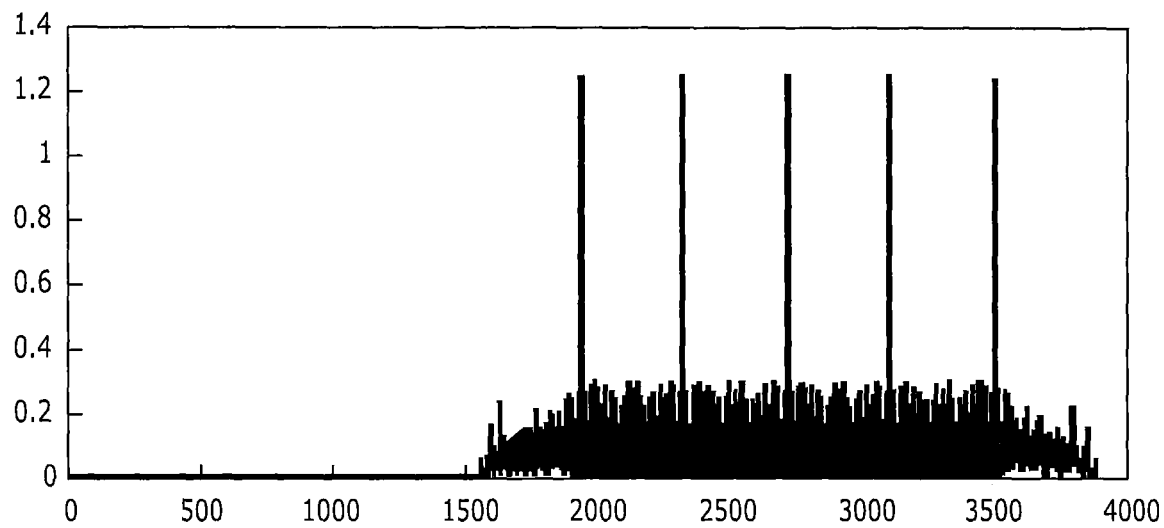
FIG. 7B INTERFERENCES FROM THE SAME TYPE OF RADARS ARE CANCELED BY LOW CROSS-CORRELATION
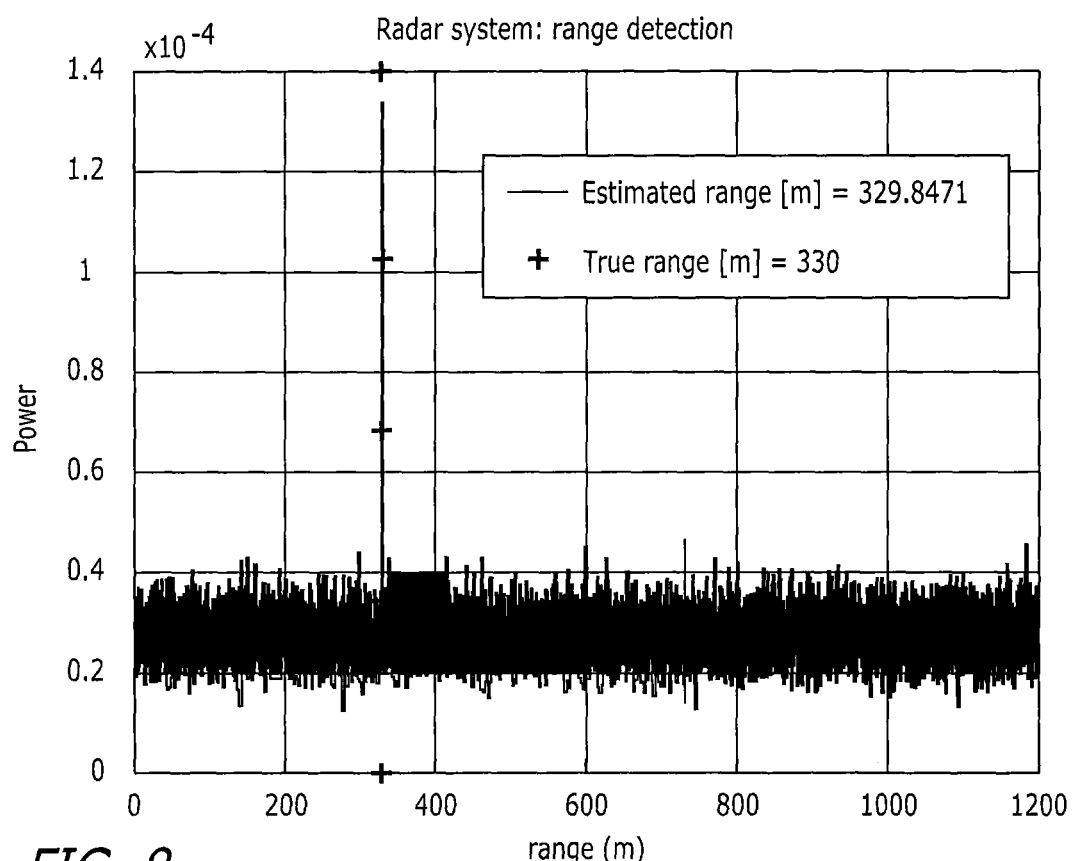
FIG. 8 SIMULATION RESULTS WITH RANGE DETECTION

METHOD AND APPARATUS FOR RADAR WAVEFORMS USING ORTHOGONAL SEQUENCE SETS

CROSS REFERENCE TO RELATED APPLICATION

This application claims priority to, and the benefit of, U.S. Provisional Patent Application No. 62/617,528, filed on Jan. 15, 2018, the entire disclosure of which is expressly incorporated by reference herein.

FIELD

The present disclosure relates to wireless systems, and specifically to radar waveforms for use in vehicle applications.

BACKGROUND

Many wireless systems use digital beamforming to generate desired beamforms and to control the direction of the beams. For example, a self-driving vehicle requires prediction speed beyond traditional systems so as to provide fast, low-latency, object detection and identification. In autonomous driving situations, it is also critical that the vehicle is able to manage unintended radar transmissions (interference) and echoes (ghost signals (multipath)). Additionally, it is important that the vehicle is able to suppress interference in the complex operational environment. Current solutions are not able to manage these tasks without unacceptable latency and inaccuracies. In light of the foregoing, there is a need for an improved technology for suppressing interference and multipath for autonomous driving applications.

SUMMARY

The present disclosure relates to methods, systems, and apparatuses for radar waveforms using orthogonal sequence sets. In one or more examples, a radar sensor, comprises a waveform transmission module adapted to generate a phase-coded waveform based on a set of concatenated orthogonal sequences. In some examples, the radar sensor further comprises a receiver adapted to estimate a range and Doppler from a received echo from the phase-coded waveform, where Doppler can be estimated from range measurements continuously within a time grid based on a synchronized timing base. An example is a common timing base from a global positioning system (GPS) system, with which the radar on the vehicle performs data fusion. With the help of an accurate and common timing base, the transmission and reception of the proposed waveforms can be assisted for high performance, low delay, and low cost.

In one or more examples, the orthogonal sequences are Zadoff-Chu (ZC) sequences, with a remark that other sequences with good auto- and cross-correlation properties can also be employed. In at least one example, the phase-coded waveform comprises an increasing and/or a decreasing phase evolution. In some examples, the phase-coded waveform comprises a triangle-type phase evolution or a saw-type phase evolution.

In one or more examples, the waveform transmission module is further adapted to transmit the phase-coded waveform. In some examples, the receiver is further adapted to receive the echo.

In one or more examples, a method for generating a radar signal comprises generating a plurality of orthogonal sequences of length L. The method further comprises assigning a first orthogonal sequence to a radar sensor device. Also, the method comprises concatenating the first orthogonal sequence multiple times with itself to form a sequence set. In addition, the method comprises generating a transmission waveform from the sequence set. Also, the method comprises receiving an echo from the transmission waveform. Additionally, the method comprises correlating the echo with the transmission waveform to identify correlation peaks. Further, the method comprises determining a Doppler estimate from a delay between the correlation peaks.

In one or more examples, the method further comprises determining a source of the echo. Some information can be modulated on the phase-coded modulation waveform, such as the source identification etiquettes. In some examples, the determining of the source of the echo comprises extracting identification information from an iPv6 address.

In one or more examples, a vehicle for autonomous driving comprises a radar sensor comprising a waveform transmission module adapted to generate a phase-coded waveform based on a set of concatenated orthogonal sequences. The radar sensor also comprises a receiver adapted to estimate a range and Doppler from a received echo from the phase-coded waveform.

In one or more examples, the vehicle is a terrestrial vehicle, an airborne vehicle, or a marine vehicle. In at least one example, the terrestrial vehicle is a car.

DRAWINGS

These and other features, aspects, and advantages of the present disclosure will become better understood with regard to the following description, appended claims, and accompanying drawings, which are not drawn to scale and in which like reference characters refer to like parts throughout, and where:

FIGS. 2, 3, and 4A-C illustrate plots of Zadoff-Chu (ZC) curves, according to examples of the present disclosure.

Figure 5:
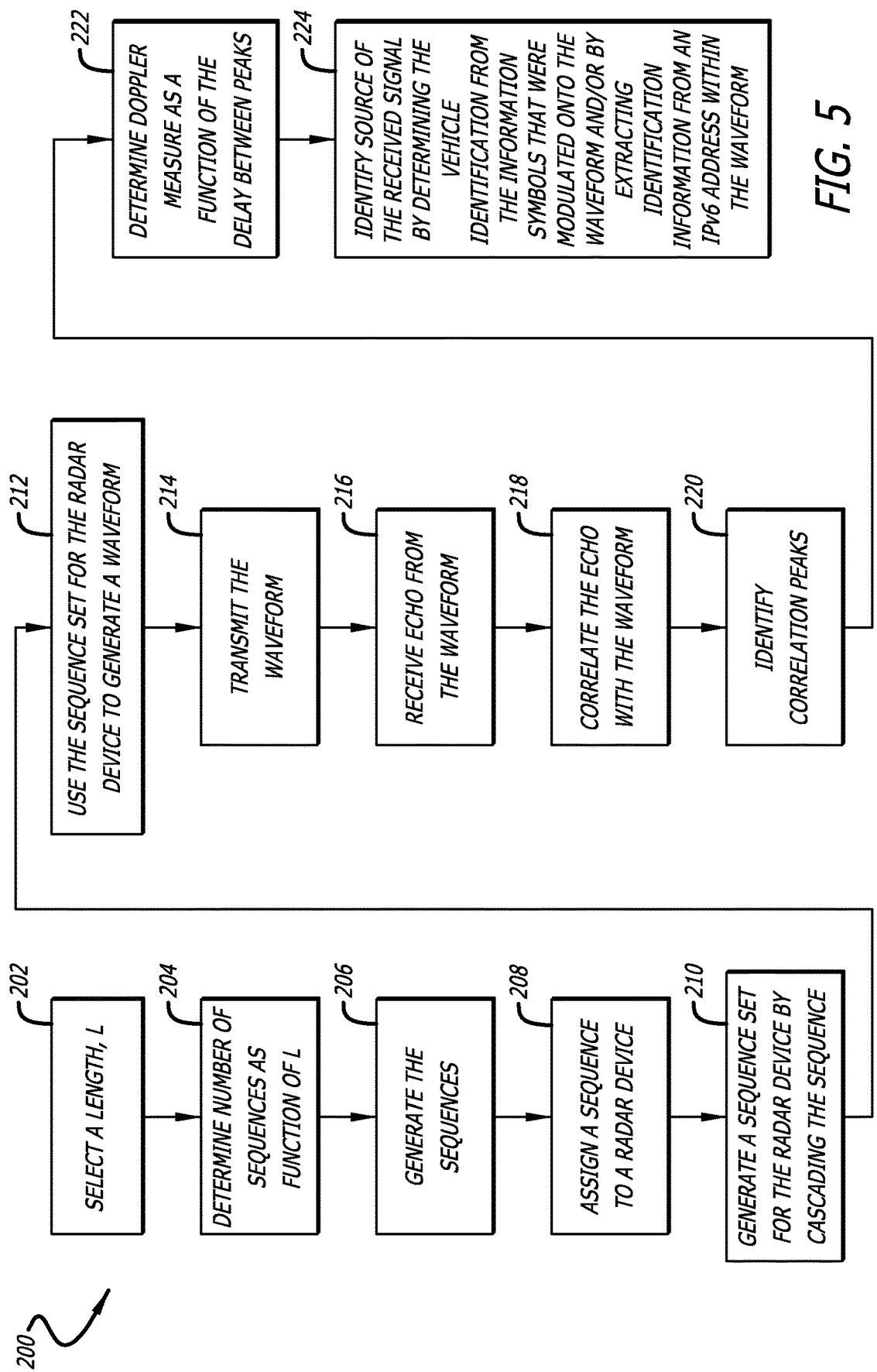

FIG. 5 illustrates a flow chart for a disclosed method for generating radar transmissions, according to examples of the present disclosure.

FIG. 6 illustrates a block diagram of an automotive radar system based on the proposed phase-coded waveform, according to examples of the present disclosure.

FIGS. 7A and 7B illustrate plots showing the perfect auto-correlation and excellent cross-correlation of the proposed waveforms, according to examples of the present disclosure.

FIG. 8 illustrates a plot showing the results of a simulation scenario, according to examples of the present disclosure.

DESCRIPTION

The methods and apparatuses disclosed herein provide an operative system for radar waveforms using orthogonal sequence sets. In one or more examples, the system of the present disclosure utilizes a transmission waveform that identifies the source of ghost signals and suppresses interference that is present.

The disclosed systems and methods are described along with the figures to illustrate examples of the present disclosure. In the illustrated examples, a radar system enables interference suppression using a disclosed waveform design that is based on polyphase sequences with optimal correlation properties. The waveform is based on a combination of multiple sequences such that an aperiodic (or linear) correlation of the waveform and the sequence itself behaves as a periodic (cyclic) correlation; there are approximately zero sidelobes. The disclosed system provides excellent detection and interference suppression performance. The cross-correlation between different waveforms is minimized by a proposed waveform set optimization procedure detailed herein.

In some examples, Zadoff-Chu (ZC) sequences (such as those used in third-generation partnership project (3GPP) fourth-generation long-term evolution (4G-LTE), LTE-Advanced, and LTE-Advanced Pro standards, as well as in the fifth-generation new radio (5G NR) specifications) are utilized by the present disclosure. Formulations of ZC sequences with better correlation properties are constructed and proposed for better system performance and trade-off. The examples described herein use a phase-coded modulation radar scheme that provides optimal coherent detection as well as range and Doppler determination. The disclosed waveform is formed of chirp pulses with monotonically increasing and/or decreasing phase evolution, where both triangle-type and saw-type phase evolutions are supported.

In some of the examples, the disclosed waveforms and associated radar systems are based on direct sequence spectrum spreading, which is capable of suppressing bandlimited interference clutters and jammers. In some examples, the system is used to encode information into waveforms, where the information carried by the waveforms may include the identity of the transmitter. Other information may include, but is not limited to, device information and/or network identifiers. In one example, a registered vehicle license identifier is transmitted in or with the information. In other examples, a MAC and/or IP address may be transmitted in or with the information. In automotive and intelligent traffic systems (ITS), such as the advanced driver assistance systems (ADAS), there are many factors to consider in controlling movement of a vehicle. These systems are highly complex with many real-world problems to solve for full large-scale commercial deployment.

The present disclosure provides solutions to these and other challenges by enabling suppression of interference and/or multipath between multiple vehicles and by allowing identification of the source of a received signal, such as from an unintended source or ghost source. For example, many vehicles have adaptive cruise control (ACC) and, therefore, at any given time there may be any number of vehicles using radar transmissions and echoes, where each vehicle is looking to detect its own echo out of this mixture of echoes. The present disclosure provides transmissions that enable each vehicle radar system to detect its own echo, while receiving multiple echoes from targets, including ghost signals (multipath) and unintended signals (interference). The radar receiver is able to distinguish echoes within a range ambiguity distance, even when they overlap with other signals.

The examples of the present disclosure are applicable in wireless communication and radar applications, and in particular, in some metamaterial (MTM) structures capable of manipulating electromagnetic (EM) waves using engineered radiating structures. Additionally, the examples of the present disclosure provide methods and apparatuses for generating wireless signals, such as radio frequency (RF) signals (e.g., with frequencies within the autonomous vehicle range (which in the United States is approximately 77 Gigahertz (GHz) and has a 5 GHz range, specifically, 76 GHz to 81 GHz)). These examples provide improved sensor capability and support object detection for autonomous driving.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Examples of the present disclosure may be described herein in terms of functional and/or logical components and various processing steps. It should be appreciated that such components may be realized by any number of hardware, software, and/or firmware components configured to perform the specified functions. For example, the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that examples of the present disclosure may be practiced in conjunction with other components, and that the systems described herein are merely examples that may be employed of the present disclosure.

For the sake of brevity, conventional techniques and components related to radar systems, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more examples of the present disclosure.

Figure 1:
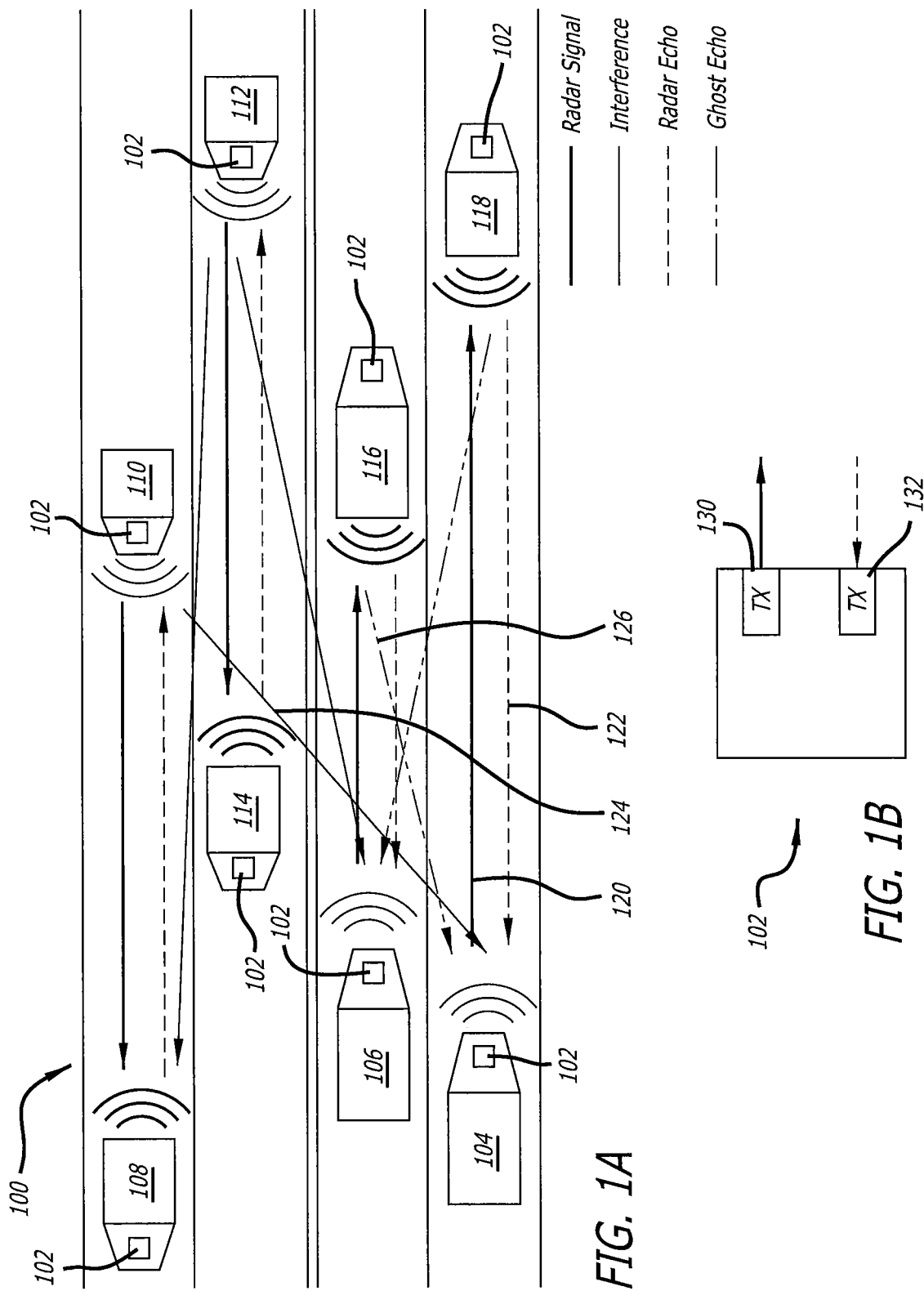
FIG. 1A illustrates vehicles having radar sensors operating in a traffic scenario, according to examples of the present disclosure.
FIG. 1B illustrates details of one of the radar sensors of FIG. 1A, according to examples of the present disclosure.

FIG. 1A illustrates vehicles 104, 106, 108, 110, 112, 114, 116, 118 having radar sensors 102 operating in a traffic scenario, according to examples of the present disclosure. In particular, FIG. 1A illustrates a typical scenario, where multiple vehicles 104, 106, 108, 110, 112, 114, 116, 118 are in an intelligent traffic system (ITS) 100 implementing radar sensor systems. It should be noted that although the vehicles 104, 106, 108, 110, 112, 114, 116, 118 are illustrated as cars in FIG. 1A, in other examples of the present disclosure, the vehicles 104, 106, 108, 110, 112, 114, 116, 118 may be other types of vehicles other than cars including, but not limited to, any combination of airborne vehicles (e.g., airplanes, helicopters, and unmanned aerial vehicles (UAVs)), terrestrial vehicles (e.g., trucks, tanks, and unmanned ground vehicles (UGVs), and marine vehicles (e.g., ships, boats, and unmanned underwater vehicles (UUVs)).

In FIG. 1A, vehicles 104, 106, 116 and 118 are moving in one direction, and vehicles 108, 114, 110, 112 are moving in the opposite direction. Each vehicle 104, 106, 108, 110, 112, 114, 116, 118 has a radar sensor 102 for detecting objects in their path and environment. FIG. 1B illustrates details of one of the radar sensors 102 of FIG. 1A, according to examples of the present disclosure. In FIG. 1B, the radar sensor 102 is shown to comprise a waveform transmission module 130, which is configured to transmit radar signals. The radar sensor 102 is also shown to comprise a receiver 132, which is configured to receive radar echoes, interference, and ghost echoes (ghost signals). In one or more examples of the present disclosure, the waveform transmission module 130 and the receiver 132 may each comprise at least one processor.

Referring back to FIG. 1A, during operation of the disclosed system, a waveform transmission module 130 of the radar sensor 102 of vehicle 104 generates and transmits a radar signal 120 towards vehicle 118. The radar signal 120 reflects off of vehicle 118, and is reflected back towards vehicle 104 as a radar echo 122. The receiver 132 of the radar sensor 102 of vehicle 104 receives the radar echo 122. In addition, the receiver 132 of the radar sensor 102 of vehicle 104 receives interference signal 124, which is generated by the waveform transmission module 130 of the radar sensor 102 of the vehicle 110. The receiver 132 of the radar sensor 102 of vehicle 104 also receives ghost echo (ghost signal) 126. Ghost echo (ghost signal) 126 is generated from a radar signal, which is generated by the waveform transmission module 130 of the radar sensor 102 of the vehicle 104, that is reflected off of vehicle 116.

Some examples of ACC radar interference occur when the traffic is dense with many vehicles present and there are many active radar sensors. Many cars incorporate short range radar (SRR) as part of their object detection systems. These SRR sensors may have wide beam transmissions, which are operational at the same time as in other vehicles. When vehicle radars transmit and receive at the same time, in the same frequency band, and in the same area as each other, they act as interference to each other. In these cases, a signal and echo received by a radar sensor's receiver may be used incorrectly to make decisions and take actions as part of the ADAS. In order to remedy this problem, in the disclosed system, each radar sensor receiver is able to distinguish its own echo from all the interfering signals and ghost echoes so that the system may make a correct detection of range to an object and a correct determination of the velocity of the object from the Doppler measure.

In some situations, an object with a large radar cross-section (RCS) may mask other echoes as it sends the strongest reflection or echo. This produces confusing results at the radar sensor's receiver. The present disclosure corrects this issue by providing comprehensive information to the radar. This information enables the radar sensor (or vehicle's sensor fusion) to learn from these experiences and conditions to better adapt to its surroundings.

It should be noted that solutions to the multiple-radar interference problem may be performed in the physical layer (PHY), the media access control (MAC) layer, and/or the network layer of the protocol stack. Combinations of these solutions may be incorporated to achieve various results. By incorporating communication capabilities of a vehicle-to-vehicle (V2V) at the network layer (e.g., L3), more information is able to be provided. However, as the communication involves signaling and control processes, the L3 processes incur delay and latency, which are unacceptable for full vehicle control. Similarly, using L2 connectivity (such as Institute of Electrical and Electronics Engineers (IEEE) 802.11p or dedicated short-range communications (DSRC)) uses the MAC layer for a "periodic neighbor search" and a "listen-before-talk" strategy at connected nodes. This solution is also not sufficient for ADAS where fast, real-time reactions and controls are required. As such, the most efficient solution, which is employed by the disclosed system, is to use the PHY layer with a special waveform that automatically cancels interference between multiple vehicles.

The present disclosure provides a radar waveform that enables detection of targets, suppression of interference, and identification of the radar source. An intelligent transportation system (ITS) enables congested areas and well-traveled areas to support many vehicles and avoid interference. The radar waveforms of the present disclosure, when echoes from different transmitters are present, enable selective detection. In this way, the radar receiver is able to isolate its own echoes, while cancelling other echoes and interference.

The radar waveforms of the present disclosure are designed to be approximately orthogonal to each other to simplify transceiver signal processing and to suppress multipath effects.

One type of modulation is code-division multiple access (CDMA), which is well-known in cellular technology, e.g., 3GPP wideband code division multiple access (WCDMA) and cdma2000-1Xevolution-data-voice/evolution-data-optimized (cdma2000-1XEVDV/EVDO), all known as third-generation (3G) mobile cellular network systems. However, this type of modulation may not be directly applicable to the disclosed radar waveforms because CDMA requires network level synchronization and strict power control in uplink transmissions. Another consideration for not using CDMA codes is the imperfectness of the correlation properties of the CDMA codes. Another issue with using CDMA is that sidelobes are generated in the auto- and cross-correlations of 3G codes (such as Walsh-Hadamard) and, as such, multipath interference and Multiple Access Interference (MAI) are created. As such, the use of CDMA codes for radar applications results in poor detection of signal to noise ratio (SNR).

To solve these issues, the present disclosure uses a formulation of Zadoff-Chu (ZC) sequence sets and waveform design. The ZC sequences have ideal periodic correlations, and good aperiodic and cross correlations (both auto and cross correlations, as they are adopted by fourth generation (4G) LTE and fifth generation (5G) systems in cell search, uplink (UL) random access, and synchronization processes). The type of ZC waveform that is utilized by the present disclosure is detectable with ideal auto-correlation. These ZC waveforms are approximately orthogonal to each other with low and controlled sidelobes.

The disclosed Zadoff-Chu (ZC) sequence sets and waveform designs use phase-coded pulse signals transmitted in a "chirp-like" manner. The phase evolution follows a monotonic increasing and/or decreasing curve, and the waveform is able to use the same spectrum, and similar detection architecture, as a chirp waveform (i.e. a frequency modulated continuous wave (FMCW)).

Figure 2:
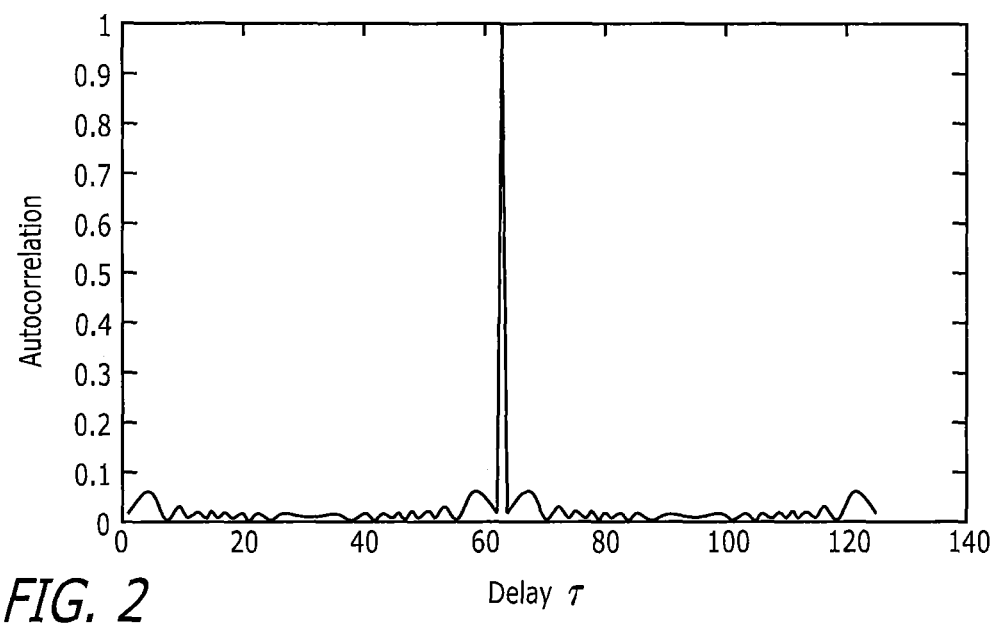
Figure 3:
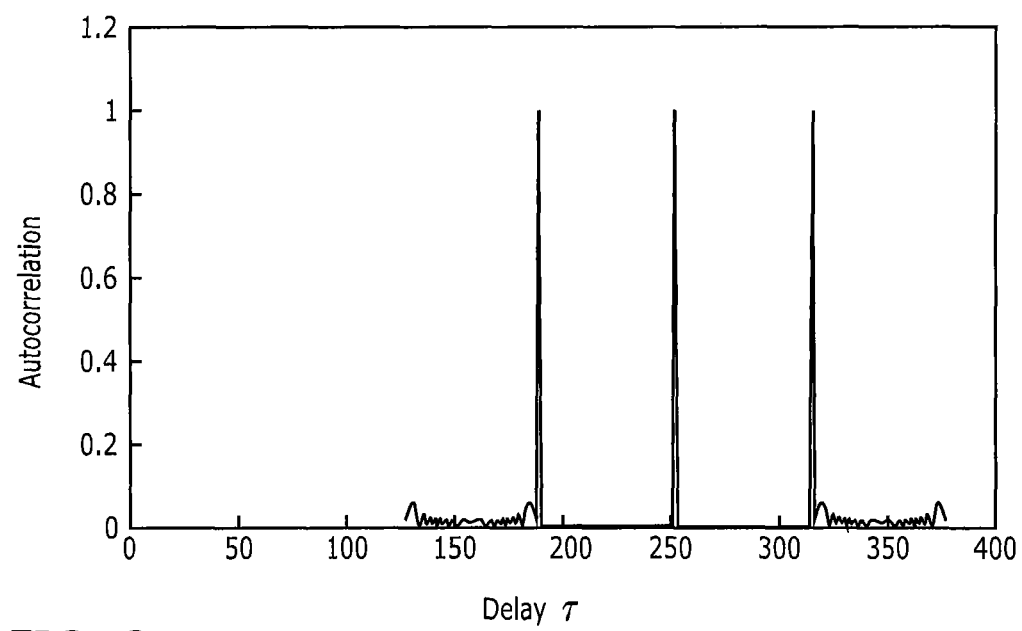
Figure 4:
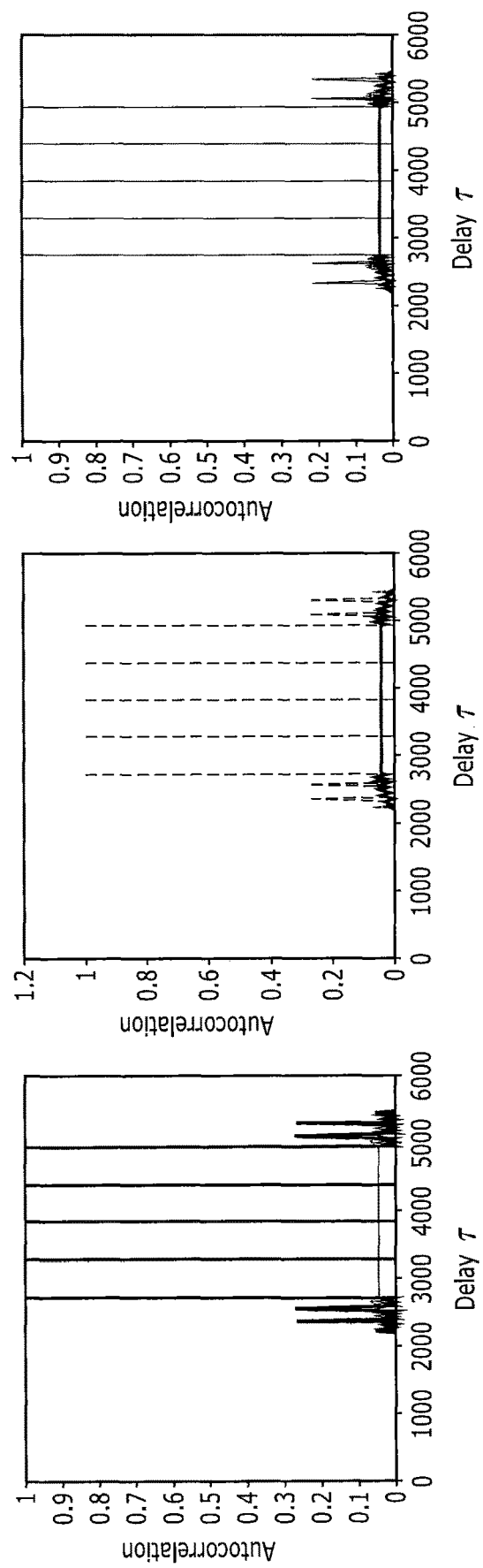

These ZC waveforms are more appropriately considered as spectrum spreading radar waveforms as they are used with spreading and de-spreading for a processing gain, and data can be modulated on each composite sequence. The ZC sequences have effectively "perfect" autocorrelation properties, as the autocorrelation of a ZC sequence with a non-zero cyclically shifted version of itself is zero. FIGS. 2, 3, and 4 illustrate plots of Zadoff-Chu (ZC) curves, according to examples of the present disclosure. In particular, FIG. 2 illustrates an example of periodic autocorrelation of a typical aperiodic signal (comprising a ZC sequence), which has a length equal to sixty-three (63). As shown in this figure, the periodic auto-correlations are all ideal as having a peak at the origin, and are approximately zero everywhere else.

In the present examples, a radar waveform is designed composing Zadoff-Chu (ZC) sequence sets, and the waveform is designed such that the periodic auto-correlation is optimized. In the present disclosure, this linear signal is transformed into a cyclic signal by cascading (concatenating) several ZC sequences together. The cascaded (concatenated) ZC sequences may not all be identical, but rather may change the chirp order and/or the amplitude of the sequences to achieve a particular goal. As such, the resultant radar waveforms are composed of the concatenated ZC sequences, where detection of objects is based on the periodic auto-correlation. This provides optimum performance of the detection system.

FIG. 3 illustrates the autocorrelation of three cascaded (concatenated) ZC sequences, where the ideal correlation is shown to be at the center peak. In particular, FIG. 3 shows the linear correlation of such a ZC code with a three-cascade of the same code with a local reference, where it is observed that for any delay value within the $2^{nd}$ and $3^{rd}$ periods are all null, thanks to the special local reference code design, thereby drastically enhancing the detector performance and robustness in presence of multipath, interference, and jamming.

FIGS. 4A-C illustrate alternate examples of ZC sequence sets, where the cross-correlations between two different sequences are at low levels. In particular, FIGS. 4A-C present several examples of linear correlations of three randomly chosen ZC codes with a five-cascade of themselves with local references, with the same observations as for FIG. 3. For sequences of length L, it has been proven that the cross-correlations are bounded by $L^{-\frac{1}{2}}$. A radar system (e.g., a waveform transmission module 130 of a radar sensor 102) may transmit the cascaded (concatenated) sequences (codes), which suppress interference and may be used to identify the source of signals, including ghost signals and unintended signals. Pseudo-random number (PRN) codes may be employed to provide excellent ranging capability, where the range is estimated by correlating the echo with a local sequence and comparing the peaks. In this way, the detection performance is optimum because periodic auto-correlation is used at the middle of the correlating receiver. When interfering echoes are present at the receiver, they are suppressed by the cross-correlation values. The multiple cascaded (concatenated) ZC waveform also provides Doppler estimation information, where the detected peaks have changing distances between them; this delta indicates the doppler.

In some examples, the cascaded (concatenated) ZC waveform carries transmitter identification information (e.g., identification of the vehicle that generated the ZC waveform). Each of the consecutive ZC sequences may be seen as a spectrum spreading symbol. During operation, while the range and Doppler are estimated by the receiver, the modulating symbols may also be detected by the receiver. In some examples, one ZC waveform is composed of seventy-two (72) sequences, carrying 72 information symbols. For a registered car in California, its department of motor vehicles (DMV) license plate has seven (7) characters, or 28 bits. For these cases, if an automotive radar receiver demodulates the ZC waveform, the receiver will be able to determine the car's license plate number to identify the car that generated the ZC waveform.

In some examples, an internet protocol version six (IPv6) address may be utilized. When using an internet protocol version six (IPv6) address, the ZC waveforms will carry 128 bits with some header and postfix, meaning that two waveforms may be sent with each IPv6 address sent. In other examples, a frame structure containing a common signaling waveform and followed by identification (ID)—specific ones can be used. In addition, it should be noted that several MAC functionalities can be provided based on the disclosed waveform design.

The present disclosure, when applied to a radar system, incorporates an innovative design waveform having many advantages, including full radar functionalities with high performance, and special features, such as interference suppression and source identification (ID).

The disclosed waveforms are based on the ideal, or perfect, periodic auto-correlations of ZC polyphase codes, thereby providing optimum detection performance. Their excellent cross-correlation properties are used to suppress interference. Some examples provide further useful features, such as multi-target detection and identification. The communication ability of the proposed waveforms makes it a possible solution for radar-communication systems, in view of integration into a vehicle-to-everything (V2X) infrastructure.

Referring back to FIG. 1A, to effect control, vehicle 104 isolates the signal of interest, specifically, radar echo 122, from the other signals. The disclosed system enables such isolation by using modulation codes that suppress interference. FIG. 5 illustrates a process for such radar reception and processing. In particular, FIG. 5 illustrates a flow chart for a disclosed method 200 for generating radar transmissions, according to examples of the present disclosure. At the start of the method 200, a length L (e.g., 63) is selected (e.g., by a waveform transmission module 130 (refer to FIG. 1AB) for the ZC sequence to be generated 202. The number of possible ZC sequences (e.g., 5) is determined (e.g., by a waveform transmission module 130) as a function of L 204. These ZC sequences, or a subset of these ZC sequences, are formed (e.g., are generated by the waveform transmission module 130) 206, and a specific ZC sequence is assigned (e.g., assigned by the waveform transmission module 130) to a particular radar device 208 (e.g., of a particular vehicle). The ZC sequence may be represented by $C=(c_0, c_1, c_2, \ldots, c_{L-1})$, where each ci is a chirp of the ZC sequence 210. The ZC sequence corresponds to a code of L chirps in length.

Then, a ZC sequence set is generated (e.g., by a waveform transmission module 130) for the radar device by cascading (concatenating) the ZC sequence with itself 210. A waveform (radar signal) comprising the ZC sequence set is then generated (e.g., by the waveform transmission module 130) 212. The ZC sequence set is a waveform identified as $W=[C|C|C \ldots |C]$, where the number of ZC sequences in the ZC sequence set is determined by the length L and the bandwidth (BW). When a ZC-based waveform is correlated with a cascaded of a certain number of copies of itself, after the first period, and before the last period, of the linear correlation, the resulting correlations are identical to the periodic correlation of itself (i.e. all-zero values except at the origin points); this interesting property ensures optimum detection performance. It should also be noted that in some examples, when the waveform (radar signal) is generated, information symbols (e.g., which represent the source's (vehicle's) identification) are modulated onto the waveform.

Then, the waveform (radar signal) is transmitted (e.g., by the waveform transmission module 130) 214. After the waveform (radar signal) is transmitted, the waveform reflects off of an object and forms a radar echo (signal). The radar echo is then received (e.g., received by receiver 132 (refer to FIG. 1B)) 216. After the radar echo is received, the received radar echo (signal) is then correlated (e.g., by the receiver 132) with the original waveform (radar signal) 218. Then, correlation peaks are identified (e.g., by the receiver 132) from the correlation data 220. Doppler is then determined (e.g., by the receiver 132) by measuring the delay between the correlation peaks 222. In some examples, the source (e.g. vehicle) of the received radar echo (signal) is then identified (e.g., by the receiver 132) by determining the vehicle identification from the information symbols that were modulated onto the waveform 224.

FIG. 6 illustrates a block diagram of an automotive radar system based on the proposed phase-coded waveform, according to examples of the present disclosure. In this figure, a waveform generator 610, a transmitter unit 620, a transmit (Tx) antenna (radiator) 630, a waveform detector 690, a receiver unit 680, and a receive (Rx) antenna (collector) 670 are shown. The waveform generator 610, transmitter unit 620, Tx antenna 630, waveform detector 690, receiver unit 680, and Rx antenna 670 are all associated with (e.g., housed on) a vehicle (e.g., refer to vehicle 104 of FIG. 1A).

It should be noted that, in some examples of the present disclosure, the waveform generator 610, transmitter unit 620, and Tx antenna 630 may all be part of a waveform transmission module 130 (refer to FIG. 1B) of a radar sensor 102 (refer to FIG. 1A) of the vehicle (e.g., refer to vehicle 104 of FIG. 1A). In one or more examples of the present disclosure, the waveform detector 690, receiver 680, and a receive (Rx) antenna 670 may all be part of a receiver 132 (refer to FIG. 1B) of the radar sensor 102 of the vehicle. Also, it should be noted that the Tx antenna 630 and Rx antenna 670 may be housed together as a single unit (a single antenna), as is illustrated in FIG. 6, or may be implemented as two separate units (two antennas).

During operation, the waveform generator 610 generates the phase-coded waveform. The waveform is transmitted by the transmitter unit 620, and radiated into the atmosphere by the Tx antenna 630 towards a target (with radar cross-section (RCS)) 650 (e.g., refer to vehicle 118 of FIG. 1A). The waveform (radar signal) propagates though the atmosphere (go-channel) 640 to the target 650, and reflects off of the target 650 in the form of a radar echo. The radar echo propagates though the atmosphere (back-channel) 660 to the vehicle (e.g., refer to vehicle 104 of FIG. 1A). The Rx antenna 670 collects the radar echo, and the receiver unit 680 receives the radar echo. The waveform detector 690 then detects the waveform within the received radar echo.

FIGS. 7A and 7B illustrate plots showing the perfect auto-correlation and excellent cross-correlation of the proposed waveforms, cancelling auto-interference caused by multipath effects, and cross-interferences from radar of the same type. Based on the spectrum spreading property of the proposed waveform and the matched filter like detection scheme, the disclosed system suppresses any bandlimited jammers, including frequency-modulated continuous-wave (FMCW) radar and co-channel radio signals by a large attenuation (e.g., for a length of sixty-four (64), the suppression is approximately eighteen (18) decibels (dB)).

FIG. 8 illustrates a plot showing the results of a simulation scenario, according to examples of the present disclosure. In this particular simulation scenario, there are ten (10) interferences of the same type using different ZC codes, where two (2) of them have a transmitting power higher than the signal of interest by twenty (20) dB.

Although particular examples have been shown and described, it should be understood that the above discussion is not intended to limit the scope of these examples. While examples and variations of the many aspects of the disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, examples are intended to exemplify alternatives, modifications, and equivalents that may fall within the scope of the claims.

Although certain illustrative examples and methods have been disclosed herein, it can be apparent from the foregoing disclosure to those skilled in the art that variations and modifications of such examples and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

I claim:

1. A radar sensor, comprising:
a waveform generator of a waveform transmission module adapted to generate a phase-coded waveform based on a sequence set, which is formed from an orthogonal sequence concatenated multiple times with itself, wherein the orthogonal sequence is a Zadoff-Chu (ZC) sequence, the waveform generator further adapted to:
generate a plurality of orthogonal sequences of length L, wherein the orthogonal sequences are Zadoff-Chu (ZC) sequences;
assign a first orthogonal sequence to a radar sensor device; and
concatenate the first orthogonal sequence multiple times with itself to form a sequence set;
generate a phase-coded waveform from the sequence set; and
a receiver adapted to estimate a range and a Doppler from a periodic auto-correlation formed from a correlation of a received echo and the phase-coded waveform comprising cross-correlation values, wherein the phase-coded waveform comprises cross-correlation values that are used to suppress interference in the received echo, the receiver further adapted to:
correlate the echo with the phase-coded waveform to form a periodic auto-correlation comprising correlation peaks;
suppress interference in the echo using the cross-correlation values; and
determine a Doppler estimate from a delay between the correlation peaks of the periodic auto-correlation.

2. The radar sensor of claim 1, wherein the phase-coded waveform comprises at least one of an increasing phase evolution or a decreasing phase evolution.

3. The radar sensor of claim 1, wherein the phase-coded waveform comprises one of a triangle-type phase evolution or a saw-type phase evolution.

4. The radar sensor of claim 1, wherein a transmit antenna of the waveform transmission module is adapted to transmit the phase-coded waveform.

5. The radar sensor of claim 1, wherein the phase-coded waveform has a frequency within an autonomous vehicle range of frequencies.

6. The radar sensor of claim 1, wherein the receiver is further adapted to estimate the Doppler from a delay between correlation peaks of the periodic auto-correlation.

7. A method for generating a radar signal, the method comprising:

generating a plurality of orthogonal sequences of length L, wherein the orthogonal sequences are Zadoff-Chu (ZC) sequences;
assigning a first orthogonal sequence to a radar sensor device;
concatenating the first orthogonal sequence multiple times with itself to form a sequence set;
generating a phase-coded waveform from the sequence set;
receiving an echo from the phase-coded waveform comprising cross-correlation values;
correlating the echo with the phase-coded waveform to form a periodic auto-correlation comprising correlation peaks;
suppressing interference in the echo using the cross-correlation values; and
determining a Doppler estimate from a delay between the correlation peaks of the periodic auto-correlation.

8. The method of claim 7, further comprising determining a source of the echo.

9. The method of claim 8, wherein the determining of the source of the echo comprises extracting identification information from an IPv6 address.

10. The method of claim 7, wherein the phase-coded waveform comprises at least one of an increasing phase evolution or a decreasing phase evolution.

11. The method of claim 7, wherein the phase-coded waveform comprises one of a triangle-type phase evolution or a saw-type phase evolution.

12. The method of claim 7, further comprising transmitting the phase-coded waveform.

13. A vehicle for autonomous driving, the vehicle comprising:
a radar sensor comprising:
a waveform generator of a waveform transmission module adapted to generate a phase-coded waveform based on a sequence set, formed from an orthogonal sequence concatenated multiple times with itself, wherein the orthogonal sequence is a Zadoff-Chu (ZC) sequence, and wherein the phase-coded waveform comprises cross-correlation values, the waveform generator further adapted to:
assign a first orthogonal sequence to a radar sensor device; and
concatenate the first orthogonal sequence multiple times with itself to form a sequence set;
generate a phase-coded waveform from the sequence set; and
a receiver adapted to estimate a range and a Doppler from a periodic auto-correlation formed from a correlation of a received echo and the phase-coded waveform comprising cross-correlation values, wherein the receiver is further adapted to suppress interference in the received echo using the cross-correlation values, the receiver further adapted to:
correlate the echo with the phase-coded waveform to form a periodic auto-correlation comprising correlation peaks;
suppress interference in the echo using the cross-correlation values; and
determine a Doppler estimate from a delay between the correlation peaks of the periodic auto-correlation.

14. The vehicle of claim 13, wherein the phase-coded waveform comprises at least one of an increasing phase evolution or a decreasing phase evolution.

15. The vehicle of claim 13, wherein the phase-coded waveform comprises one of a triangle-type phase evolution or a saw-type phase evolution.

16. The vehicle of claim 13, wherein a transmit antenna of the waveform transmission module is adapted to transmit the phase-coded waveform.

17. The vehicle of claim 13, wherein the receiver is further adapted to receive the echo.

18. The vehicle of claim 13, wherein the vehicle is one of a terrestrial vehicle, an airborne vehicle, or a marine vehicle.

19. The vehicle of claim 18, wherein the phase-coded waveform has a frequency within an autonomous vehicle range of frequencies.

* * * * *